UNITED STATES PATENT OFFICE.

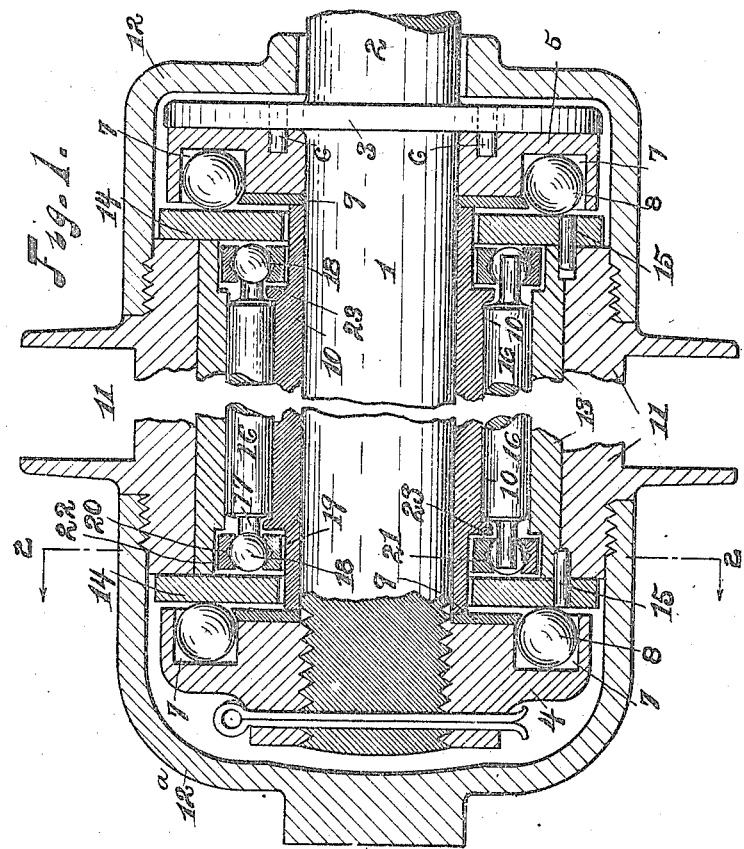
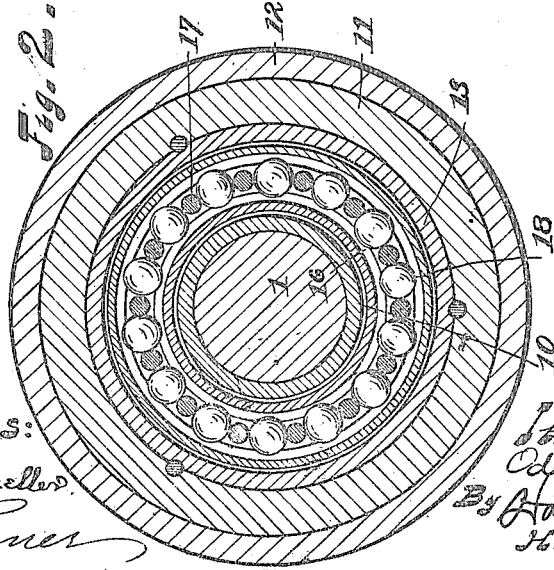

ODELL WILSON, OF LAKEWOOD, OHIO.

ROLLER-BEARING.

1,188,126. Specification of Letters Patent. Patented June 20, 1916.

Application filed October 23, 1913. Serial No. 796,849.

*To all whom it may concern:*

Be it known that I, ODELL WILSON, a citizen of the United States, residing at Lakewood, in the county of Cuyahoga and State of Ohio, have invented certain new and useful Improvements in Roller-Bearings, of which the following is a specification.

The invention relates to journal bearings in which rollers are interposed between the journal and bearing members; and the object of the improvement is to provide means for properly spacing the rollers apart so that they will not come in contact with each other. The object of the invention, thus set forth in general terms, is attained by the construction and arrangement illustrated with reference to a wheel-hub on an axle-spindle, in the accompanying drawing, wherein—

Figure 1 is a longitudinal section of the hub showing the spindle journaled therein; and Fig. 2, a cross section of the same on line 2—2, Fig. 1.

Similar numerals refer to similar parts throughout the drawings.

In the embodiment of the invention illustrated, the spindle 1 of the axle 2 is preferably provided with the fixed collar 3 on the inner end, and the locking nut 4 on the outer end. The supplemental collar 5 may be used on the outer side of the fixed collar 3, and is fixed thereon by means of the dowel pins 6. Annular race ways 7 are formed in the nut 4 and the supplemental collar 5, in which race ways are located series of balls 8 for receiving the end thrust of the bearing member.

Retaining disks 9 may be countersunk in the sides of the nut 4 and the supplemental collar 5 with beveled peripheries overlapping the inner sides of the race ways 7, for retaining the balls 9 therein. The journal sleeve 10 may also be provided on the journal 1 between the retaining disks 9, and it is evident that when the parts thus described (excepting the balls 8) are clamped between the fixed collar 3 and the nut 4, they will be rigidly secured upon the journal and may be referred to collectively as the journal member.

The hub 11 is preferably provided with the end caps 12 and 12ª freely inclosing the fixed collar 3 and the nut 4 of the journal member. For convenience in assembling the parts, the hub 11 may also be provided with the detachable sleeve 13, corresponding to and spaced at an interval around the sleeve 10 of the journal member. The ring plates 14 may also be provided on the ends of the hub 11 and bearing sleeve 13 and are fixed against rotation with respect to the same by the dowel pins 15. These parts may be referred to collectively as the bearing member.

The ring plates 14 freely surround the end portions of the journal sleeves 10, and the parts are so proportioned and arranged that when the balls 8 are seated in the race ways 7, they will protrude slightly beyond the presented sides of the supplemental collar and the nut, thus forming an abutment for the opposing sides of the ring plates 14, and stopping endwise movement of the bearing member with reference to the journal member, and vice versa.

The series of rollers 16, are located in the interval between the journal sleeve 10 and the bearing sleeve 13, and these rollers are provided with the axial trunnions 17 on each end, between which trunnions are located series of spacing balls 18, which in turn are alined by and retained in the race ways 21 and 20 formed in the separate concentric rings 19 and 22, respectively on the inner and outer sides of each series spacing balls. The race rings 19 and 22 are freely positioned in the interval between the journal sleeve 10 and bearing sleeve 13, and also between the ends of the rollers and the adjacent ring plates 14, so that although generally guided by these respective parts, they may be referred to as freely floating between them.

The top flanges 23 may be provided, as shown, around the journal sleeve 10, to prevent an endwise movement of the rollers with reference to the journal and bearing members, or the free ends of the trunnions 17 may be arranged to be stopped by the ring plates 14 for the same purpose; thereby avoiding any clamping of the spacing balls between the rollers and the ring plates. In either case, it is evident that when the journal member is rotated within the bearing member, or vice versa, the spacing balls will be freely held in proper position by the floating race rings, without any binding of the balls or rings between the adjacent members; and the parts are preferably so proportioned and arranged that the centers of the spacing balls are located squarely between the axes of the roller trunnions, thus preventing any wedging action by a radial disarrangement of the rollers or the balls.

I claim:

1. A journal member and a bearing member with intervening rollers having axial trunnions on their ends, series of spacing balls between the trunnions, separate concentric floating race rings retaining each series of balls, and means on one member free of the spacing balls and race rings stopping endwise movement of the rollers for preventing a binding of the balls between the adjacent parts.

2. A journal member and a bearing member with intervening rollers having axial trunnions in their ends, series of spacing balls between the trunnions, separate concentric floating race rings retaining each series of balls, and means free of the spacing balls and race rings stopping endwise movement of the one member with reference to the other member for preventing a binding of the balls between the adjacent parts.

3. A journal member and a bearing member with intervening rollers having axial trunnions on their ends, series of spacing balls between the trunnions, separate concentric floating race rings retaining each series of balls, means on one member free of the spacing balls and race rings stopping endwise movement of the rollers with reference to the same member, and means free of the spacing balls and race rings for stopping endwise movement of the one member with reference to the other member for preventing a binding of the balls between the adjacent parts.

ODELL WILSON.

Witnesses:
A. L. BRENNAN,
M. E. GRAY.